(12) United States Patent
Loveland

(10) Patent No.: US 8,441,348 B2
(45) Date of Patent: May 14, 2013

(54) MULTIPLE DEVICE LOSS STATUS RETRIEVAL WITHOUT ID PROVISION

(75) Inventor: Damien Gerard Loveland, Richmond (CA)

(73) Assignee: Absolute Software Corporation, Vancouver (CA)

( * ) Notice: Subject to any disclaimer, the term of this patent is extended or adjusted under 35 U.S.C. 154(b) by 357 days.

(21) Appl. No.: 12/948,332

(22) Filed: Nov. 17, 2010

(65) Prior Publication Data

US 2011/0115621 A1 May 19, 2011

Related U.S. Application Data

(60) Provisional application No. 61/262,118, filed on Nov. 17, 2009.

(51) Int. Cl.
*G08B 1/08* (2006.01)

(52) U.S. Cl.
USPC .................................. 340/539.13; 340/8.1

(58) Field of Classification Search ............. 340/539.13, 340/8.1, 571, 568.1, 572.1, 10.1, 10.4; 728/35; 455/456.2
See application file for complete search history.

(56) References Cited

U.S. PATENT DOCUMENTS

| | | | |
|---|---|---|---|
| 5,715,174 A | 2/1998 | Cotichini et al. | |
| 5,764,892 A | 6/1998 | Cain et al. | |
| 5,802,280 A | 9/1998 | Cotichini et al. | |
| 6,244,758 B1 | 6/2001 | Solymar et al. | |
| 6,269,392 B1 | 7/2001 | Cotichini et al. | |
| 6,300,863 B1 | 10/2001 | Cotichini et al. | |
| 6,507,914 B1 | 1/2003 | Cain et al. | |
| 6,833,787 B1 | 12/2004 | Levi | |
| 7,088,989 B2 | 8/2006 | Guo | |
| 7,194,760 B2 | 3/2007 | Nordman et al. | |
| 7,589,616 B2 | 9/2009 | Klatsmanyi et al. | |
| 7,590,837 B2 | 9/2009 | Bhansali et al. | |
| 7,818,803 B2* | 10/2010 | Gordon | 726/22 |
| 2005/0216757 A1 | 9/2005 | Gardner | |
| 2005/0221799 A1 | 10/2005 | Tervo et al. | |
| 2006/0145839 A1 | 7/2006 | Sandage | |
| 2006/0158310 A1 | 7/2006 | Klatsmanyi et al. | |
| 2006/0161628 A1* | 7/2006 | Nagy et al. | 709/206 |
| 2006/0272020 A1 | 11/2006 | Gardner | |
| 2008/0134284 A1 | 6/2008 | Bhansali et al. | |
| 2008/0141383 A1 | 6/2008 | Bhansali et al. | |
| 2008/0250510 A1 | 10/2008 | Stevens | |
| 2008/0276326 A1 | 11/2008 | Bhansali et al. | |

(Continued)

OTHER PUBLICATIONS

PCT International Search Report in PCT/CA2010/001841, dated Feb. 9, 2011.

*Primary Examiner* — Toan N Pham
(74) *Attorney, Agent, or Firm* — Knobbe, Martens, Olson & Bear, LLP

(57) ABSTRACT

A system is disclosed that enables multiple electronic devices to be tracked in the case of theft or loss without the need for monitoring or tracking the devices prior to the loss or theft. The system operates by sending bulk status information regarding the lost/stolen statuses of multiple devices to one of these devices. The receiving device then decodes the bulk status information to determine its own lost/stolen status. If the status reveals that the device is currently reported as lost or stolen, the device initiates an appropriate security action, such as the transmission of its location to a monitoring center.

19 Claims, 2 Drawing Sheets

U.S. PATENT DOCUMENTS

| | | |
|---|---|---|
| 2008/0320312 A1 | 12/2008 | Duffus et al. |
| 2009/0135002 A1 | 5/2009 | Blinnikka et al. |
| 2010/0169965 A1 | 7/2010 | Chhabra et al. |
| 2010/0229248 A1 | 9/2010 | Glave |

* cited by examiner

MULTIPLE DEVICE LOSS STATUS RETRIEVAL WITHOUT ID PROVISION

CROSS-REFERENCE TO RELATED APPLICATION

This application claims the benefit of U.S. Provisional Patent Application No. 61/262,118 filed on Nov. 17, 2009, priority from the filing date of which is claimed, and which is hereby fully incorporated by reference.

BACKGROUND

The present disclosure relates to the protection of user privacy while allowing electronic devices to be tracked in the event of their loss or theft.

Laptops, and increasingly other electronic devices such as cell phones, personal digital assistants (i.e. "PDAs"), smart phones (e.g. BlackBerry™, iPhone™), memory sticks, electronic books, personal media devices (e.g. iPod™), gaming devices and personal computers, are being remotely tracked so that they can be recovered in the event of theft. Such tracking may be effected by sending location information to a remote storage site or an email server.

Proprietary information is routinely stored on electronic devices, and the need to protect such proprietary or sensitive data, and to recover such devices if they are lost or stolen, is self-evident. However, the privacy of the users of such devices needs to be taken into consideration when providing protection of such devices and/or data.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below.

The location data provided by a lost or stolen electronic device to a monitoring center has far greater value than the location data provided before a theft. In addition, legitimate users of computing or communication devices may object to the location of the device being tracked while they are using it (i.e. before or in the absence of any theft or loss).

The subject matter described herein provides a system, method and apparatus for allowing a protected electronic device to interpret signals received from a monitoring center to determine whether or not it has been reported lost or stolen, but without providing unique or traceable identification to the monitoring center. If the device has not been reported lost or stolen, then it does not provide any location information to the monitoring center. If, however, the device has been reported lost or stolen, then it may begin to report its location to the monitoring center, and in some embodiments may also take further actions such as deleting files.

The location information that is transferred may comprise, for example, IP addresses, GPS coordinates, Wi-Fi signal strengths, cell tower signal strengths, street addresses, times at these locations and/or time spent at these locations. In addition to the location information, identification indicia for the device may also be provided. As a result, location data for only stolen or lost devices is received and/or stored at a monitoring center.

DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the drawings, like reference numerals designate like or similar steps or parts.

DETAILED DESCRIPTION OF SPECIFIC EMBODIMENTS

A. Terminology

Figure 1:
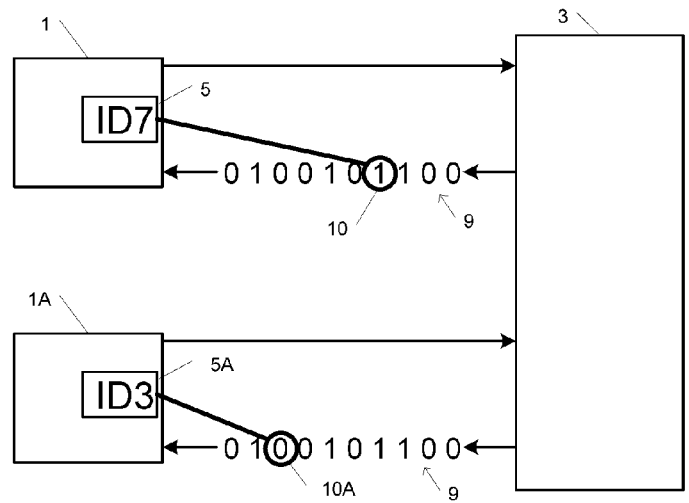
FIG. 1 is a functional flow diagram schematically illustrating the interaction between a monitoring center and a plurality of host devices of a system and method in accordance with embodiments of the disclosed subject matter.

Agent—as used herein, is a software, hardware or firmware agent that is ideally persistent and stealthy, and that resides in a computer or other electronic device. The agent preferably provides servicing functions which involve communication with a monitoring center or remote server. The agent is preferably tamper resistant and may be enabled for supporting and/or providing various services such as data delete, firewall protection, data encryption, location tracking, message notification, and software deployment and updates. An illustrative embodiment of an agent is found in the commercially available product Computrace Agent™. The technology underlying the Computrace Agent™ has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; and 6,507,914 and related foreign patents. Details of the persistent function of an agent are disclosed in U.S. Patent Application Publication Nos. US2005/0216757 and US2006/0272020. The technical disclosures of these documents are fully incorporated by reference as if fully set forth herein. It is feasible to use an equivalent agent to the Computrace Agent™, or less preferably an alternative agent with less functionality. For the purposes of the present disclosure, the minimal functional attributes of the agent are to facilitate communications between the electronic device and a monitoring center, to interpret information received from the monitoring center and to conditionally report location information to the monitoring center. Communications may be initiated by the agent, by the monitoring center or by both.

Host—This is the electronic device to be protected. Examples of a host include a laptop, a netbook, or a smart phone. The agent resides in the host.

Monitoring Center—This is a guardian server or other computer or server that the agent communicates with or sends a message to. It may be an email server or it may be a distribution of servers or other computers, and may refer to an office comprising such servers together with staff that can take telephone calls and/or investigate data communicated from the host to the monitoring center. For example, provided an internet connection is available to the host, an agent may call the monitoring center at some selected suitable interval to report the location of the host, download software upgrades if there are any and repair any security modules that are or should be installed on the host. In the embodiments disclosed herein, the agent would conditionally upload to remote storage of the monitoring center location information and/or any other data desired to be transferred from stolen host devices. Communication to the monitoring center may take place, for example, via a wired or wireless telephone network, WIFI, WIMAX, cable or satellite.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. Programming instructions used for implementing embodiments of the described subject matter may be defined in one or more languages such as C++, Basic, Java, or variations of these. In general, unless otherwise indicated, singular elements may be in the plural and vice versa with no loss of generality. The use of the masculine can refer to masculine, feminine or both.

B. General Principles

The basic elements of an embodiment of the system herein disclosed are illustrated in FIG. 1. The system comprises a plurality of protected electronic host devices 1, 1A, each with a corresponding identifier 5, 5A, and a remote monitoring center or server 3. The host device 1 requests information from the monitoring center 3. The information requested is that which enables the host device 1 to make a determination as to whether or not it has been reported lost/stolen. The monitoring center 3 responds by transmitting information 9 back to the host device 1, which information 9 contains the lost/stolen statuses of a plurality of electronic host devices. The monitoring center 3 cannot determine the identity of the host device 1 because its identification number 5 is not transmitted to the monitoring center 3. The host device 1, using its identification number 5 as a filter or key, selects from the information 9 the portion of the information 10 necessary for the host device 1 to make a determination of its lost/stolen status.

A second electronic host device 1A also requests information from monitoring center 3. The monitoring center 3 responds by transmitting the same information 9 to the host device 1A. The host device 1A, using its identification number 5A as a filter or key, selects from the information 9 the portion of the information 10A necessary for the host device 1A to make a determination of its lost/stolen status.

C. Exemplary Embodiments

Figure 2:
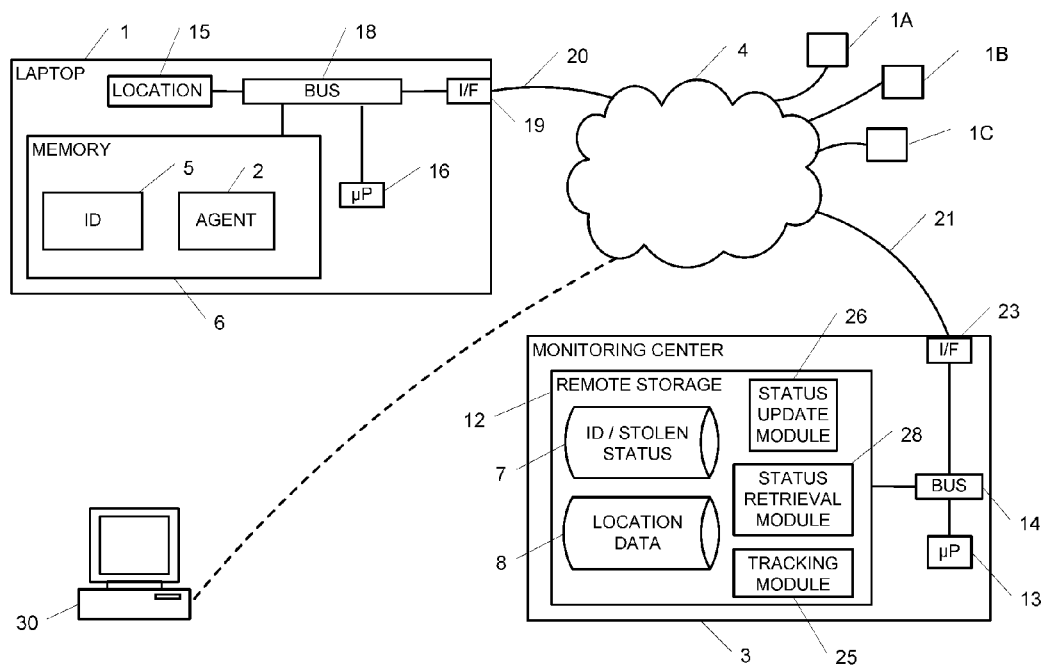
FIG. 2 is a schematic functional block diagram of a system and method in accordance with embodiments of the disclosed subject matter.

A schematic functional block diagram of the hardware of a preferred embodiment is illustrated in FIG. 2. An electronic host device 1 such as a laptop computer comprises an agent 2 which can communicate regularly, aperiodically, randomly, semi-randomly and/or according to triggers, with remote storage 12 at a monitoring center 3 via the internet 4, via some other telecommunications network, or via a combination of these. Internet communication protocols, GSM communication protocols, SMS messaging and other methods can be used for all or some of the communications, for example.

The host device 1 may contain common components such as a microprocessor 16, a location determining module 15, a communications interface 19 and a memory 6, all operably connected together via a bus 18. The memory 6 may be a combination of discrete memories of the same or different types. The memory 6 contains an identification number or code 5 that is preferably unique to the host device 1, and the memory 6 may also contain the agent 2. The interface 19 may be used to connect 20 the host device 1 to a communications network 4 such as the internet or a telecommunications network. The link 20 may be wired, wireless or a combination of both.

The location device 15 may be a GPS or A-GPS receiver device, or some other suitable device performing location determination. The location device 15 may be contained in the memory 6 of the host device 1, or it may be a component or module separate from the memory 6, as shown in FIG. 2. There may be one, two or more location devices 15, each operating on a different principle or one acting as a backup for another.

The monitoring center 3 may be a server which contains an interface 23 via which it may be connected to the network 4 via a link 21. The monitoring center 3 may contain a bus 14 via which components internal to the monitoring center 3 communicate with each other, and a processor 13 for processing computer readable instructions in the memory 12. Examples of instructions may be those used in status update module 26, status retrieval module 28 and tracking module 25. Also located in the memory 12 are databases for storing information relating to stolen or lost devices 7 and for storing location data 8.

A terminal 30 can be used to communicate to the monitoring center 3. For example, in the case of theft of a host device 1, the user of the host device can report its identity and theft to the monitoring center 3 using terminal 30. The status update module 26 in the monitoring center 3 will then flag the host device 1 as stolen. The stolen status database 7 would normally contain identifiers for all of the host devices that are protected by the system. A user may in some embodiments be associated with a single device via a password log on, and may only need to report a theft.

Other host devices 1A, 1B, 1C may also be protected by the same system. These may be laptop computers, as illustrated in relation to host device 1, or they may be smart phones, gaming machines, gaming interfaces, netbook computers or any other type of electronic device. Each device protected by the system should ideally have a unique identification number within the system, and the number may, for example, be numeric, hexadecimal, alpha, alphanumeric or contain special symbols.

Figure 3:
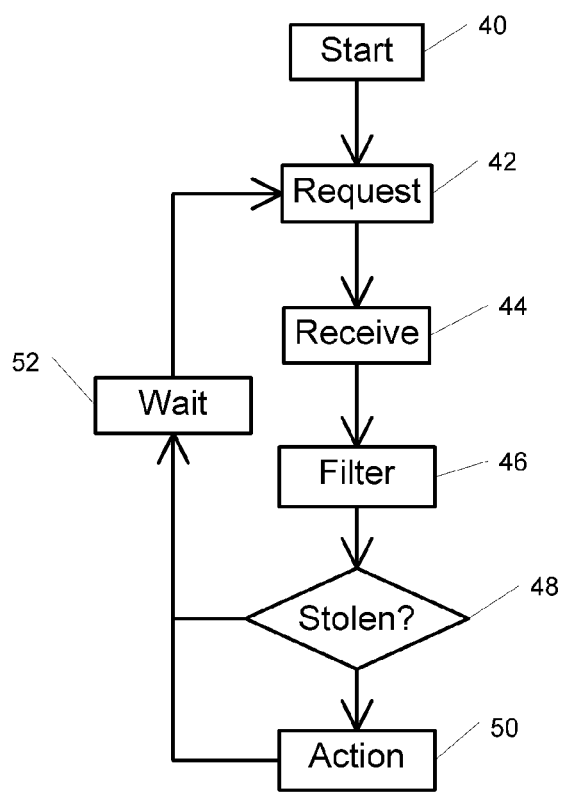
FIG. 3 is a functional flow diagram schematically representing the flow of the functional process of a host device in accordance with embodiments of the disclosed subject matter.

FIG. 3 schematically illustrates the flow of the functional process that a protected host device 1 of an embodiment of the disclosed subject matter undergoes. Once the system is set up and started 40, the agent 2 in the host device 1 transmits a request 42 to the monitoring center 3. The request 42 is for the monitoring center 3 to provide information comprising the theft or loss status of the host device 1. The host device 1 then receives 44 the requested information, in one or more packets. In a simple case, the monitoring center 3 may provide a packet containing a byte of information. The byte is a series of eight bits, i.e. 1's or 0's, where a 1 represents a stolen device and a 0 represents a device that is not stolen. The agent 2 then filters 46 the string of information in the byte according to its ID 5. If, for example, the ID of the host device 1 is "7", then the agent 2 selects the corresponding, $7^{th}$ bit of the byte. Depending on the value of the $7^{th}$ bit, the agent 2 is able to determine 48 whether the host device 1 has been reported lost or stolen.

If 48 the host device 1 has been reported stolen, then the agent 2 can optionally initiate a security action 50, such as locking down the host device 1, encrypting data, deleting encryption keys, deleting data, sounding an alarm, transmitting location data, sending emails, capturing screen shots, capturing key strokes, notifying nearby devices, taking camera shots, taking video clips, etc.

If 48 the host device 1 has not been reported lost or stolen, then the agent 2 waits 52 a selected suitable period of time before making a subsequent request 42 for theft/loss status information from the monitoring center 3. The wait 52 may be such that the host device 1 calls every day, every 25 hours, every hour, at random intervals, as a result of detecting certain events, semi-randomly, or a combination of the foregoing.

After a host device 1 has detected that it has been reported stolen 48 and has taken action 50, then it can, after a waiting period 52, make a further request to the monitoring center 3 to obtain an update of its status. Alternately, after a host device 1 has detected 48 that it has been reported stolen, the monitoring center 3 may directly update the agent 2 of host device 1 as to the stolen status of the host device 1.

By way of example, the action 50 that is taken by the agent 2 in the host device 1 could be the provision of its identity and location data to the monitoring center 3. The agent 2 could retrieve location information from the location module 15 and send it at regular, irregular or random intervals to the monitoring center 3. At the monitoring center 3, the tracking module 25 stores the supplied location data in the location database 8, together with an identifier for the stolen host device 1.

Figure 4:
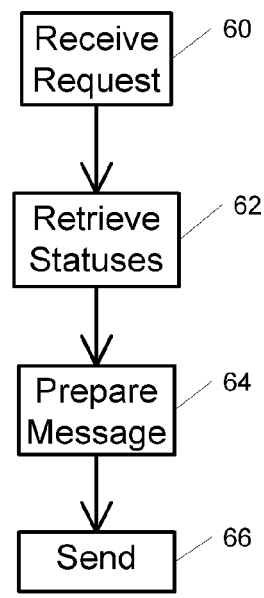
FIG. 4 is a functional flow diagram schematically representing the flow of the functional process of a monitoring center in accordance with embodiments of the disclosed subject matter.

FIG. 4 schematically illustrates the flow of the functional process of a monitoring center 3 in accordance with embodiments of the disclosed subject matter. In step 60, the monitoring center 3 receives a request for information comprising stolen/lost status for a protected host device 1, without knowing the identity 5 of the host device 1. The status retrieval module 26 in the monitoring center 3 is run by the processor 13 to retrieve 62 the status information from the stolen device records database 7. The information is prepared 64 in a packet that is then sent 66 to the host device 1. The information comprises the theft/loss statuses for a number of protected host devices 1. The monitoring center 3 does not know the identity of the host device with which it is communicating, and therefore does not know whether it is communicating with a device that has been reported lost or stolen.

D. Status Information

If there are many host devices that need protecting, then it becomes impractical to provide status information for all host devices to each requesting device. For large numbers, protected host devices may be grouped in thousands, and for each thousand devices, a common coded information packet(s) could be sent. For example, devices with identification numbers from 0-999 could request a web page or information packet that corresponds to the statuses of all of these devices. Devices with identification numbers from 1000-1999 could request a different information packet. Devices can be grouped in any suitably sized lots, for example in 100's, 250's, or some other number. Devices in a group need not be consecutively numbered. When status information that is provided by the monitoring centre is divided into pages, then although the packet being requested depends on the identification number of the host device, the host device does not provide its full identification number to the monitoring center.

As well as information relating to the theft/loss statuses of multiple devices, additional information may also be included to disguise the fact that there is any particular theft/loss information there at all, as in steganography.

The information may be provided in HTML format that can be displayed in a browser, or a program that to some extent mimics a browser. For example, it may be provided in an image, or in an advertisement. It may also be displayed in a default home page of a browser.

If the information is contained in an image, a simple example would be a line, where each pixel indicates the stolen status for a particular protected device. The pixels may vary very slightly in colour to indicate whether a device is stolen or not. Such slight colour changes would not be easily perceptible to the human eye.

E. Alternatives and Variations

Steps in the flowcharts may be performed in a different order to those illustrated, or they may be combined where shown separately. Components may be interchanged for equivalents, or varied in number and type.

Much of the detailed description has been related to protecting laptop computers, but other electronic devices can be protected with the disclosed system equally as well.

Actions taken by the protected device may be stealthy, such that an unauthorized user of the device is unaware that the action is being taken. Alternately, an action may be overt, such as the sounding of an alarm.

Except where indicated otherwise, all of the steps and tasks described herein may be performed and fully automated by a computer system, and may be embodied in software code modules executed by one or more general purpose computers. The code modules may be stored in any type of computer-readable medium or other computer storage device. Some or all of the methods may alternatively be embodied in specialized computer hardware. The computer system may, in some cases, be composed of multiple distinct computers or computing devices (e.g., physical servers, workstations, storage arrays, etc,) that communicate and interoperate over a network to perform the described functions. Each such computing device typically includes a processor (or multiple processors) that executes program instructions stored in a memory or other computer-readable medium. The results of the disclosed methods may be persistently stored by transforming physical storage devices, such as solid state memory chips and/or magnetic disks, into a different state.

The present description is of the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

What is claimed is:

1. A method performed by an electronic host device to facilitate recovery thereof when the host device is lost or stolen, the method comprising:
   transmitting a request to a remote monitoring center for bulk status information relating to the lost or stolen status of a plurality of electronic host devices;
   receiving the bulk status information from the remote monitoring center;
   analyzing the received bulk status information with an identity key stored in a memory of the electronic host device to determine whether the electronic host device has been reported lost or stolen; and when the electronic host device is determined to have been reported lost or stolen, transmitting information relating to the location of the electronic host device to the monitoring center.

2. The method of claim 1, wherein the bulk status information does not include an identifier of the electronic host device.

3. The method of claim 1, wherein the bulk status information includes a plurality of status information portions, each of which corresponds to a respective one of the plurality of electronic host devices, and the step of analyzing the received bulk status information comprises using the identity key to select the status information portion that corresponds to the electronic host device.

4. The method of claim 1, wherein the request for bulk status information does not include said identity key.

5. The method of claim 1, wherein the request for bulk status information includes an identifier of a group to which the plurality of electronic host devices belong, wherein said electronic host device is a member of said group.

6. The method of claim 1, wherein receiving the bulk status information comprises receiving an HTML page that has said bulk status information encoded therein.

7. The method of claim 1, wherein receiving the bulk status information comprises receiving an image that has said bulk status information encoded therein.

8. A non-transitory computer-readable medium that stores executable code that directs an electronic host device to perform a method that comprises:
   transmitting a request to a remote monitoring center for bulk status information relating to the lost or stolen status of a plurality of electronic host devices;
   receiving the bulk status information from the remote monitoring center;
   analyzing the received bulk status information with an identity key stored in a memory of the electronic host device to determine whether the electronic host device has been reported lost or stolen; and
   when the electronic host device is determined to have been reported lost or stolen, transmitting information relating to the location of the electronic host device to the monitoring center.

9. An electronic host device programmed to perform the method of claim 1.

10. A method performed by an electronic host device, comprising:
   receiving a bulk status message transmitted by a monitoring center, said bulk message including status information for each of a plurality of electronic host devices, including said electronic host device, said status information indicating, for each electronic host device, whether the respective electronic host device has a status of lost or stolen based on reports submitted to the monitoring center;
   determining, using an identifier of the electronic host device, that the bulk status message indicates that the electronic host device has a status of lost or stolen; and
   in response to said determination, performing a security action.

11. The method of claim 10, wherein performing a security action comprises transmitting information regarding a location of the electronic host device to enable said location to be monitored from a remote location.

12. The method of claim 10, wherein performing a security action comprises one or more of: locking down the electronic host device, encrypting data, deleting encryption keys, deleting data, sounding an alarm, sending emails, capturing screen shots, capturing key strokes, notifying nearby devices, taking camera shots, and taking video clips.

13. The method of claim 10, wherein the bulk status message does not include unique identifiers of any of the plurality of electronic host devices.

14. The method of claim 10, wherein the bulk status information includes a plurality of status information portions, each of which corresponds to a respective one of the plurality of electronic host devices, and the method comprises using said identifier to select the status information portion that corresponds to the electronic host device.

15. The method of claim 10, wherein the method further comprises transmitting a request for the bulk status information to the monitoring center, said request including a group identifier that identifies a group corresponding to said plurality of electronic host devices.

16. The method of claim 10, wherein receiving the bulk status message comprises receiving an HTML page that has said status information encoded therein.

17. The method of claim 10, wherein receiving the bulk status message comprises receiving an image that has said status information encoded therein.

18. A non-transitory computer-readable medium that stores executable code that directs an electronic host device to perform a method that comprises:
   receiving a bulk status message transmitted by a monitoring center, said bulk message including status information for each of a plurality of electronic host devices, including said electronic host device, said status information indicating, for each electronic host device, whether the respective electronic host device has a status of lost or stolen based on reports submitted to the monitoring center;
   determining, using an identifier of the electronic host device, that the bulk status message indicates that the electronic host device has a status of lost or stolen; and
   in response to said determination, performing a security action.

19. An electronic host device programmed to perform the method of claim 10.

* * * * *